Aug. 4, 1925.
F. G. WHITTINGTON
1,548,233
STEERING WHEEL DRIVE FOR MOTOR VEHICLE INSTRUMENTS
Filed March 17, 1922
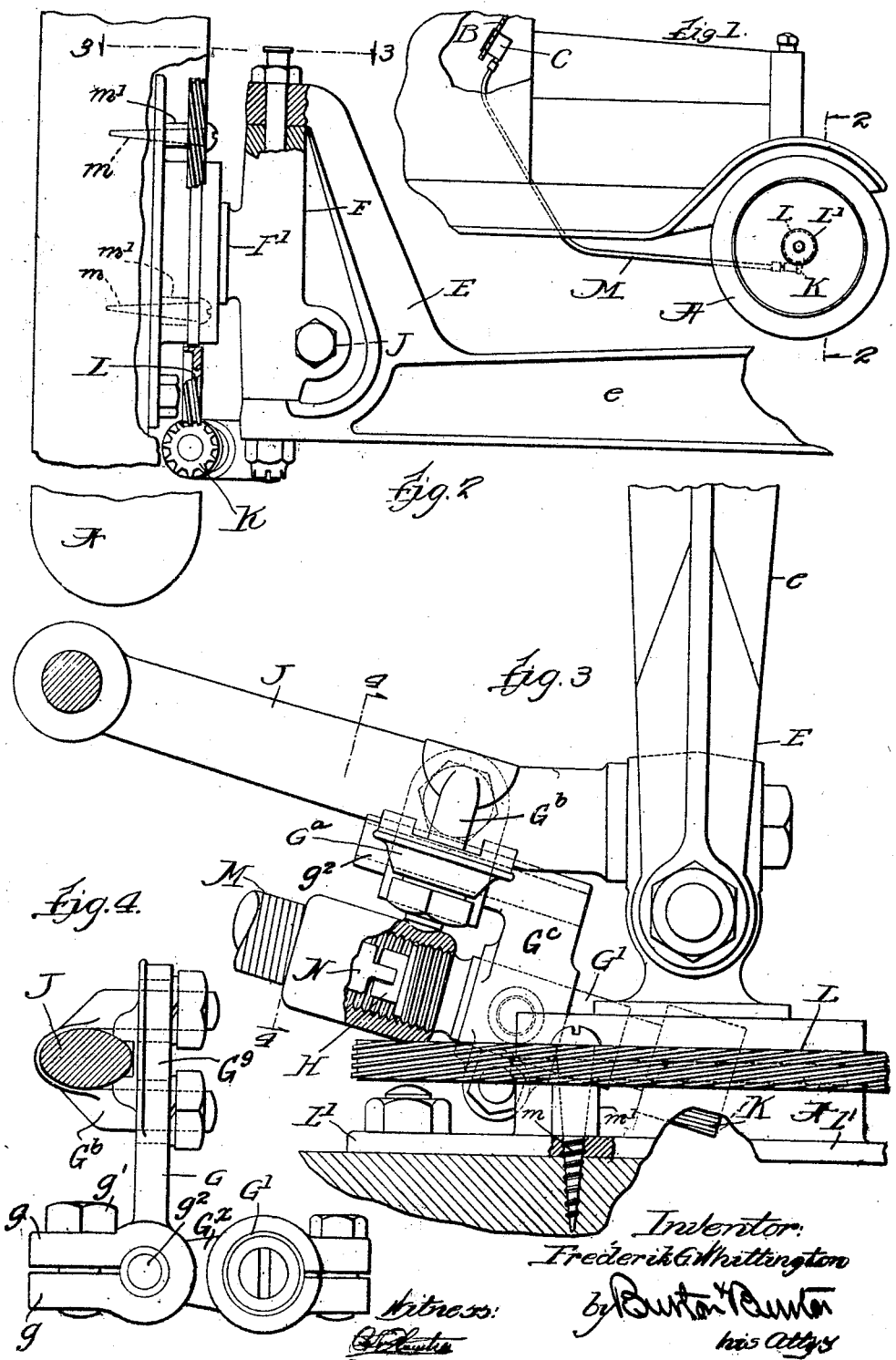

Patented Aug. 4, 1925.

1,548,233

UNITED STATES PATENT OFFICE.

FREDERIK G. WHITTINGTON, OF EVANSTON, ILLINOIS, ASSIGNOR TO STEWART-WARNER SPEEDOMETER CORPORATION, OF CHICAGO, ILLINOIS, A CORPORATION OF VIRGINIA.

STEERING-WHEEL DRIVE FOR MOTOR-VEHICLE INSTRUMENTS.

Application filed March 17, 1922. Serial No. 544,646.

*To whom it may concern:*

Be it known that I, FREDERIK G. WHITTINGTON, a citizen of the United States, having residence in Evanston, in the county of Cook and State of Illinois, have invented certain new and useful Improvements in Steering-Wheel Drives for Motor-Vehicle Instruments, of which the following is a specification, reference being had to the accompanying drawings, forming a part thereof.

The purpose of this invention is to provide an improved construction for driving a speedometer or other instrument carried by a motor vehicle from the steering wheel of the vehicle. It consists in the elements and features of construction shown and described as indicated in the claims.

In the drawings:—

Figure 1 is a plan view of a portion of a motor vehicle, including the right hand steering wheel which is shown equipped with this invention.

Figure 2 is a section at the line, 2—2, on Figure 1.

Figure 3 is a detail section at the line, 3—3, on Figure 2.

Figure 4 is a section at the line 4—4 on Fig. 3.

In the structure shown in the drawings, A is the right hand steering wheel of a motor vehicle, B is the dash board, C indicates the speedometer mounted on the dash board; E, F, are the two parts of the steering knuckle, E being the part rigid with the fixed axle, $e$, and F the part which carries the steering wheel spindle, $F^1$. G is a two-part bracket mounted upon the knuckle, F, and preferably, as shown, upon the steering arm, J, of said knuckle member, said bracket having one member, $G^a$, clamped by a clamping yoke, $G^b$, on said steering arm, and a second member, $G^c$, formed with a split bearing as seen at the lugs, $g$—$g$, with a clamping bolt, $g^1$, for clamping the cylindrical stem, $g^2$, of the second member, $G^x$, of said two-part bracket which has a journal bearing, $G^1$, which is parallel to the stem, $g^2$, and when the device is mounted on the steering arm, J, it is oblique to the plane of the steering wheel. In said journal bearing $G^1$ there is journaled and longitudinally stopped a shaft, H, having at one end a spiral toothed pinion, K, which meshes with a spirally-toothed gear-annulus, L; applied upon the inner side of the steering wheel and rigidly secured thereto for rotating therewith. The opposite end of the journal bearing, $G^1$, is exteriorly threaded for attachment of the customary interiorly threaded terminal of the casing of the flexible shaft, M, of which the rotary member, N, is coupled with the end of the shaft, H, journaled in said bearing, said shaft being provided with the customary means for such coupling. Preferably, as shown, the bracket, G, is mounted for positioning the spiral pinion, K, at the under side of the spiral gear annulus, L, that is, below the axis of the steering wheel. This permits leading off the flexible shaft toward the speedometer at the most convenient position for the minimum bending of the shaft to reach the speedometer at the customary position of the latter on the dash board.

It is designed, but not obligatory that the gear-annulus shall be of such diameter that it may be applied to the steering wheel within the dimensions of the flange, $L^1$, of the hub of the steering wheel where securement is conveniently effected by screws, $m$, taking into the wooden body of the hub, spacing sleeves, $m^1$, being interposed between the flange, $L^1$, and the gear-annulus, L, as seen in Figure 3.

It will be seen that the two-part construction of the bracket, G, with the cylindrical stem, $g^2$, of the second part rotatable and slidable and arranged to be clamped fast in the split bearing of the first member, affords means of accurately adjusting the spiral gear pinion K, for meshing with the gear annulus, L, accommodating minor variations in diameter and lateral positioning of said gear annulus.

I claim:—

1. In combination with a steering knuckle and steering wheel of an automotive vehicle, a spiral toothed annulus constituting a driving gear rigid with the steering wheel at the inner side, a correlatively toothed pinion mounted to mesh with the tooth of the annulus at a side thereof at which a tangent extends in general in fore-and-aft direction with respect to the vehicle, a shaft for said pinion having its journal bearing carried on the member of the knuckle by which the steering wheel is carried, said shaft trending rearwardly in a direction oblique with respect to the plane of the steering wheel, and a flexible shaft coupled directly to said pinion shaft for connection with an instrument mounted on the vehicle.

2. In the construction defined in claim 1, foregoing, the oblique bearing being positioned for engagement of the pinion with the annulus at the lower side of the latter.

3. In the construction defined in claim 1, foregoing, a two-part bracket member for carrying the pinion shaft journal bearing consisting of one part attached rigidly to the knuckle member which carries the steering wheel, and a second part which has the oblique journal bearing mentioned, said two parts being engaged with each other for adjustment relative to each other to carry the journal bearing part slidably and rotatably in the other part along and about a line parallel to said journal bearing and offset therefrom away from the steering wheel.

In testimony whereof, I have hereunto set by hand at Chicago, Illinois, this 11th day of March, 1922.

FREDERIK G. WHITTINGTON.